United States Patent [19]

Owens et al.

[11] Patent Number: 5,299,116
[45] Date of Patent: Mar. 29, 1994

[54] LOST BAGGAGE INVENTORY AND CLAIM SYSTEM

[75] Inventors: Bryan K. Owens, Highland Park; William E. Gonseaux, Cedar Hill, both of Tex.

[73] Assignee: Baggage Services Network, Inc., Dallas, Tex.

[21] Appl. No.: 769,967

[22] Filed: Oct. 2, 1991

[51] Int. Cl.[5] .............................................. G06F 15/00
[52] U.S. Cl. ..................................... 364/403; 235/385
[58] Field of Search ................ 364/401, 403; 235/384, 235/385

[56] References Cited

U.S. PATENT DOCUMENTS 4,711,994 12/1987 Greenberg et al. ................ 235/384

OTHER PUBLICATIONS

"Total Apollo Baggage system", United Airlines, Jan. 1984.
"Baggage Management Analysis System", Jan. 1991.
"Acu-Trak Baggage Management System", Aug. 1988.
"ACTS Airlines Computerized Baggage Tracing System", Oct. 1990.
SITA-Bahamas Proposal for Braniff (2-volumes).

Primary Examiner—Roy N. Envall, Jr.
Assistant Examiner—Laura Brutman
Attorney, Agent, or Firm—Richards, Medlock & Andrews

[57] ABSTRACT

A baggage tracing system includes a plurality of bag inventory stations, each equipped with a menu-driven workstation for entering documentary information related to the bag. Bag content data is also entered, as well as video images illustrating the bag and its contents. Each workstation is also menu-driven for entering claim requests. Bag records and claim records input via the workstation are transferred to a centralized data base for storage, and for retrieval on request to carry out matching functions for matching claim requests with bag records. The baggage tracing system of the invention can operate autonomously, or transmit and receive bag and claim records with respect to other remotely located systems or equipment.

37 Claims, 10 Drawing Sheets

FIG. 8
FIG. 9
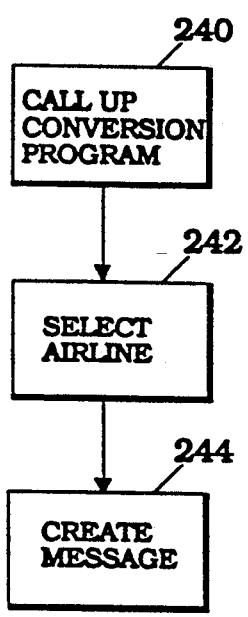
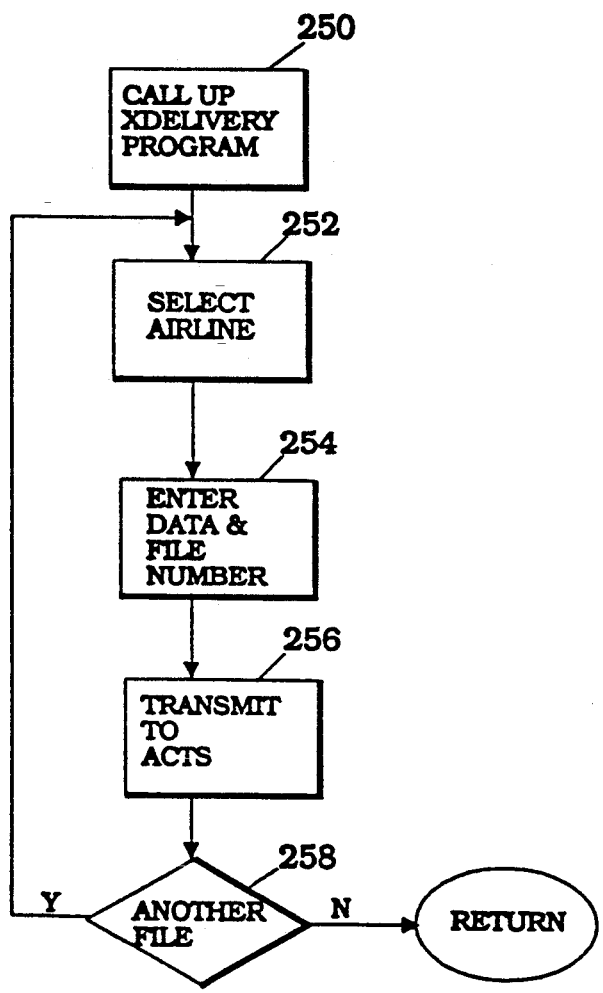

LOST BAGGAGE INVENTORY AND CLAIM SYSTEM

BACKGROUND OF THE INVENTION

The travel industry, and especially airlines, have become efficient carries of both passengers and the passenger's baggage. However, the passengers and the baggage are frequently separated, in that the baggage is often loaded, stored and unloaded from the aircraft, train, bus, etc., and thus not controlled by the passenger. Accordingly, the baggage is frequently lost, thereby necessitating additional time and expense for the carrier in finding and returning the baggage to the owners. This situation is exacerbated when the baggage is mishandled and ends up at a location different from the passenger's destination, or a different carrier may be holding an unclaimed bag while another carrier holds the loss report. It can be appreciated that passenger carriers have to address two different aspects of lost baggage, namely the administration of loss reports and claim requests, and then the unclaimed baggage itself and associated documentation and forms identifying the baggage. It can be appreciated that a significant expense to the transport carrier is the matching of lost baggage with the passengers. Not only does lost baggage create poor relations between the carrier and the passenger, but also additional personnel and equipment are required in order to find lost baggage and return it to the proper owner. In many cases, lost baggage is never returned to its proper owner and thus the transport carriers are bound to reimburse the passengers, frequently in excess of the actual value of the baggage and its contents.

The more rudimentary baggage matching systems are labor intensive, require additional personnel to fill out claim forms which include information that identify the baggage, contents, owner information, etc. Personnel are also required to physically inspect the lost baggage and inventory the content, as well as prepare documents that describe the baggage and list the contents. More sophisticated systems are computerized for coordinating the efforts to match claims with lost baggage and reduce the time by which lost bags are returned to the rightful owners. Such systems represent an improvement insofar as they increase the actual number of matches between lost luggage and the owners. FIG. 1 illustrates an example of the current baggage tracing systems. Typically, the matching of baggage has evolved as a two-step process, including a primary tracing time period followed by a secondary tracing time period. In the primary tracing time period, which normally includes a five day period following the loss, a majority of the baggage is returned to the owner as the owner's name, bag type, color, etc. information can be easily matched with a loss report filed by the owner. Primary tracing of lost baggage is generally carried out either by personnel physically, or more probably by intermediate-level computer tracing systems, such as shown in FIG. 1. A well-known baggage system, commonly known as Easytrac is shown associated with multiple domestic airlines. The Easytrac system is also shown associated with airline front-end systems that are especially adapted for accommodating lost baggage and matching the baggage with the owners. The arrows linking the Easytrac tracing system with the domestic carriers comprise computer data links for passing claim information and lost baggage information to the Easytrac system, where comparisons are made to match the claims with the lost baggage. A similar system, commonly known as Bagtrac, is shown operating between international carriers and the domestic airline front-end systems, as well as with the domestic front-end systems for the international carriers. Similar tracing and matching of lost baggage is carried out in the Bagtrac computerized system. The Easytrac and Bagtrac computerized tracing systems are primarily involved in matching lost baggage during the primary tracing period. The data terminals and personal computers utilized for entry of data in such systems provide for no video imaging capabilities and are not menu driven.

In the event luggage is not matched with its owner in the primary tracing period, it is transferred to a central baggage service office, whereupon a secondary tracing period begins in which further and more intense efforts are carried out to find the owner of the lost bag. Also, when a bag enters the secondary tracing period, the bag is opened at the central baggage service office and the contents are inventoried to further characterize the particularities of the bag for use in matching it with the owner. In addition, the bag is itself fully characterized as to the type of bag, maker, color, etc., together with the inventoried contents to form a computer file. The computer file of the bag and contents is transmitted to a centralized airline computer tracing system (ACTS) where the file is uniquely identified with a Standard Message Identifier (SMI) number known as an "SHL." Claims filed by the owners of lost bags are also entered into the ACTS system and are uniquely identified by a unique SMI number known as an SND. The computerized ACTS system is programmed with an algorithm for comparing the information of baggage files with the information of claim files to find either matches or near-matches. Near-matches comprise best guesses that have a reasonable probability of being the actual claim filed against the bag at issue. It can be appreciated that there are usually at least ten or twenty near-matches generated by the ACTS system for single pieces of luggage, and frequently the number of near-matches is much higher.

Match and near-matching of bag and claim files are transmitted back to the central baggage service offices and presented as printout copies for further analyzation by personnel. The personnel inspecting the match and near-match printouts may concur that a lost bag belongs to a particular owner, whereupon the bag is returned to the owner. More likely, the ACTS system presents numerous near-match printouts, whereupon personnel must compare the results and make a mental judgement as to which claim is the best match found by the ACTS system. The comparison of the near-match results provided by the ACTS system is time consuming and onerous and requires a certain degree of familiarity with the nomenclature of the near-match printout. For example, the ACTS system printout is not easily understandable, is not user friendly, and includes cryptic information that must be mentally transformed into other usable information for comparison purposes. For instance, information on a printout line may include "BN 22 PWX Pierre 0201." Such information defines a brown bag of type "22" with pockets and wheels, and made by Pierre Cardin, and where the bag was inventoried on the date "0201." Further, other information may include "CCMMMM" meaning a jacket for a male, "FEMMM" meaning shoes for a male, HBXXX meaning a hat, SRMMMM meaning a sweater for a male, and "SSXXXX" indicating a sweatshirt. Further, both the claim printout and the bag printout of the near-match may include comments further identifying the bag contents, such as pictures or wording on the clothes, the titles of books in the bag, etc. A typical SND printout for a bag claim is shown below, immediately followed by only one typical SHL printout of an unclaimed bag as found by the ACTS system to be a near match.

```
DALLZWN
.MIAXEWN 181640Z MIAXE1S

SND DALWN 01176 ORTIZ LO GY 29 XXX 0727
RC BLU RED/POUCH W TOOLS/SP GRY/FLAG CALIF.AZ/FE RUBBER
BOOTS.NORELCO SANDER. FACE MASKS/TI LEVIS/2 BAGS LAX PHX
FEMMMM HDTOWE RCMMMM SDMMMM SGMMMM SPCLOT TFZZZZ TIMMMM

SHL G DALWN 80162 WN 216654 GN 30 XXX AMERIC 0813
13AUG TI 4 BLU/SD WILD PRINT.YLW TANK DO IT IN THE DIRT.
BLK.BLU.YLW TANKS/SG DENIM/SD/ BLU WEST S SLEEVE/FE WHT
TRAX SMF
FEMMMM SDMMMM SGMMMM TIMMMM
```

As can be appreciated, tracing personnel must study the near-match printouts very carefully and compare the cryptic identifying information and thereby arrive at a best guess as to whether a match exists. Often, a match may be thought to exist, whereupon the baggage is returned, only to be again returned by a passenger as not being his or her baggage.

For the foregoing, it can be seen that a need exists for a baggage matching system that makes more efficient the process of matching claims with lost baggage. Another need exists for better information characterizing the baggage so that the matching process can be optimized. Yet another need exists for a system which is more user friendly for entering bag and claim information and for retrieving information, and to realize a system that is more easily utilized and training of personnel is made easier.

SUMMARY OF THE INVENTION

In accordance with the principles and concepts of the present invention, the disclosed system and method of operation thereof substantially reduce or eliminate the disadvantages and shortcomings associated with the prior art systems and techniques. According to an important feature of the present invention, both claim request information and unclaimed baggage information is input into a menu-driven workstation and stored respectively in claim files and bag files. In this manner, data in bag and claim files is complete, and moreover such information can be organized in an orderly manner for editing, retrieval, and search purposes. In creating a bag file according to the system, information concerning the bag itself, as well as its contents, are entered into various fields of the bag file via a keyboard according to menu prompts, in a manner that is easily understood by inventory personnel. In addition, video equipment is provided to capture an image of the bag, as well as and one or more images of the opened bag with the contents thereof displayed. The video images are stored in association with the information input via a workstation keyboard, and all stored in a system data base. Claim files are similarly created by an operator entering claim information according to numerous menus for completing the fields of a claim file.

A number of similarly equipped workstations operate independently in accumulating inventory information concerning lost bags. The workstations are connected by way of a local area network (LAN) and file server to a central data base which stores all the bag files and records. The system can operate autonomously with the workstations and operators in comparing claim requests with bag files retrieved from the central data base. The many bag files can be indexed according to different criteria so that the tracing personnel can efficiently select different bag files according to selected criteria for finding matches between lost bags and claim requests. In addition, the system is connectable by way of modems to remote airline or other types of terminals so that bag file information can be transferred for inspection and/or comparison by other personnel. For example, a remote terminal may retrieve a bag file from the central data base so that one or more video images of a bag and/or contents can be viewed at the remote location.

These systems can also operate in conjunction within another computerized tracing system, such as the ACTS system, for transferring bag files so that the bag file information is available to multiple systems, whereby multiple tracing and matching functions can be carried out.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 8 is a flow chart depicting the functions of reformatting bag file and claim file data prior to transmission to the ACTS system;

FIG. 9 is a flow chart of the programmed operations in processing Xdelivery bag data prior to transmission to the ACTS system;

DETAILED DESCRIPTION OF THE INVENTION

Figure 1:
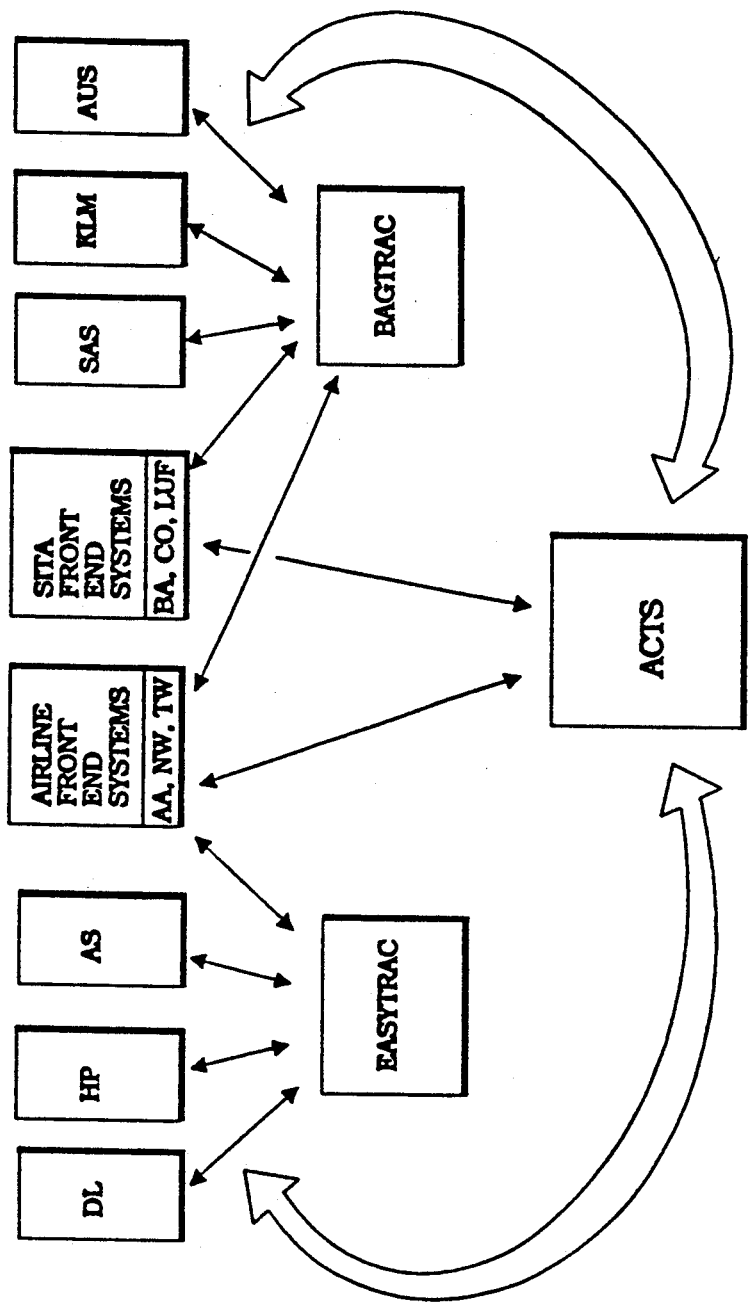
FIG. 1 is a generalized block diagram of a primary and secondary baggage tracing system, of the type well known in the art.
Figure 2:
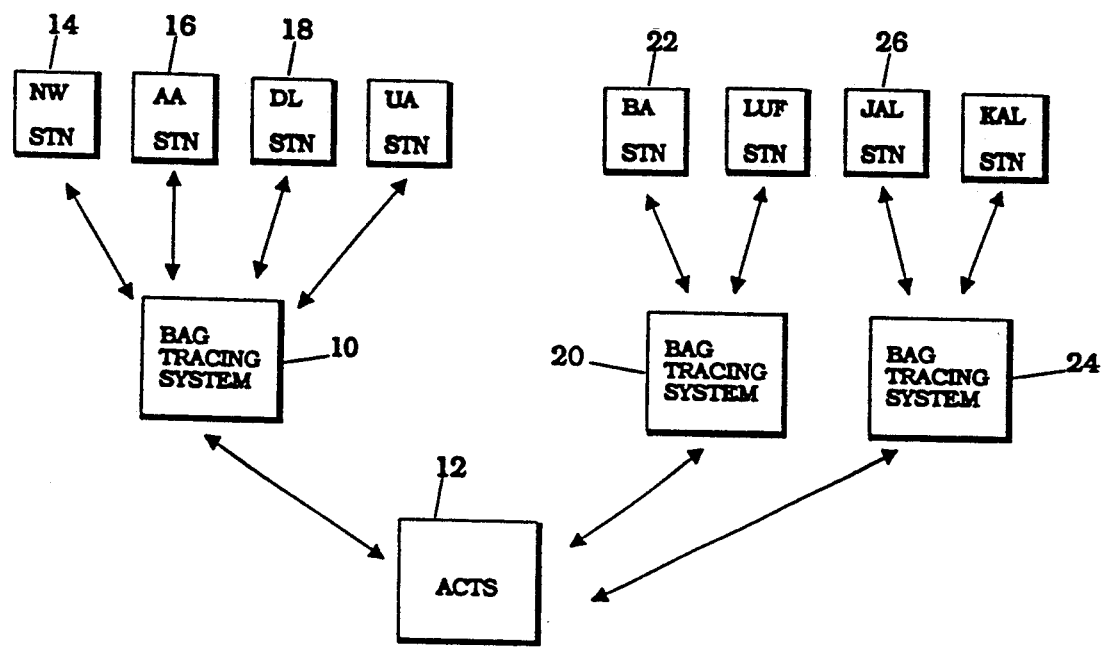
FIG. 2 is a generalized block diagram of the tracing system of the invention in one type of commercial environment.

With reference to FIG. 2, there is illustrated one environment in which the present invention may be advantageously practiced. Specifically, shown is a bag tracing system adapted for accommodating lost baggage on both a domestic and international basis. The network shown according to this embodiment includes multiple levels of tracing, utilizes a centralized data base and equipment of the bag tracing system of the invention 10, as well as that of the conventional ACTS system 12. As noted in this embodiment, the central baggage service offices have been bypassed, and the various domestic airline stations, designated by numerals 14, 16 and 18, forward the lost baggage and the claim information to the bag tracing system 10. In other words, lost baggage that is found and/or claims that have arisen with the various domestic carriers 14, 16 or 18 is forwarded to the domestic bag tracing system 10 in an attempt to achieve matches. Similarly, another bag tracing system 20 of the invention, designated for use with European transport carriers, such as designated by numeral 22, forwards the lost baggage and claim information to the European bag tracing system 20 for matching claim requests with lost baggage. Shown also is an Asian bag tracing system 24 of the invention that services the claim requests and lost baggage data with respect to Asian transport carriers, designated by reference numeral 26. As can be appreciated, claim requests and lost baggage data can be entered into any one of the systems 10, 20 or 24 and retrieved and searched in an attempt to match the lost baggage with the claimants. It should be noted that in many instances a claim request may arise from a transport carrier that is different from the carrier that has the unclaimed bag corresponding to the claim. To that end, it should be noted that according to this embodiment of the invention, claim requests from one transport carrier can be entered into the data base of the bag tracing system 10, while the corresponding lost bag from another carrier is inventoried and the corresponding video and text file data is entered into the respective data base of the tracing system 10. Bag tracing and matching functions can be carried out in the bag tracing system 10 to find matches between the claims and the bags. The other bag tracing systems 20 and 24 can also function in a similar manner. Other situations may arise in which the data relating to either the claim or the lost baggage may not reside in the data base of the tracing system 10, but may reside in the ACTS system 12. As will be described more fully below, the tracing system 10 routinely transmits bag file data and claim data to the ACTS system 12, whereupon the system 12 conducts matching functions. This latter action can be carried out on both a domestic and international basis.

There may also be situations in which a claim request can be registered with, for example, a domestic transport station 14, whereas the lost bag itself is found by a European station 22. In this instance, the ACTS system 12 can receive a claim request from the domestic bag tracing system 10 and receive bag inventory data from the European bag tracing system 20, whereupon matching or near matching functions can be carried out by the ACTS system 12. As will be described in more detail below, claim and bag inventory data is routinely reformatted in the bag tracing systems 10, 20, 24 and periodically transferred to the ACTS system 12. With the centralized bag tracing systems, 10, 20 and 24, the claim and bag inventory data is entered into the respective data bases according to a more uniform protocol and format so that better and more thorough data is available for matching purposes, and a higher degree of uniformity exists throughout the system in finding lost baggage for the claimants. In other words, a more uniform criteria and procedure is available throughout the domestic and international locations.

While the principles and concepts of the invention are described herein in terms of a system directed to luggage or baggage, the invention is applicable to other subject matter, such as packages, articles and cargo. In addition, the baggage tracing system of the invention is described herein in connection with unclaimed baggage and claims arising from airline transport systems, it should be understood that other transport systems such as bus, train and common carriers can advantageously employ various aspects and features of the invention.

Figure 3:
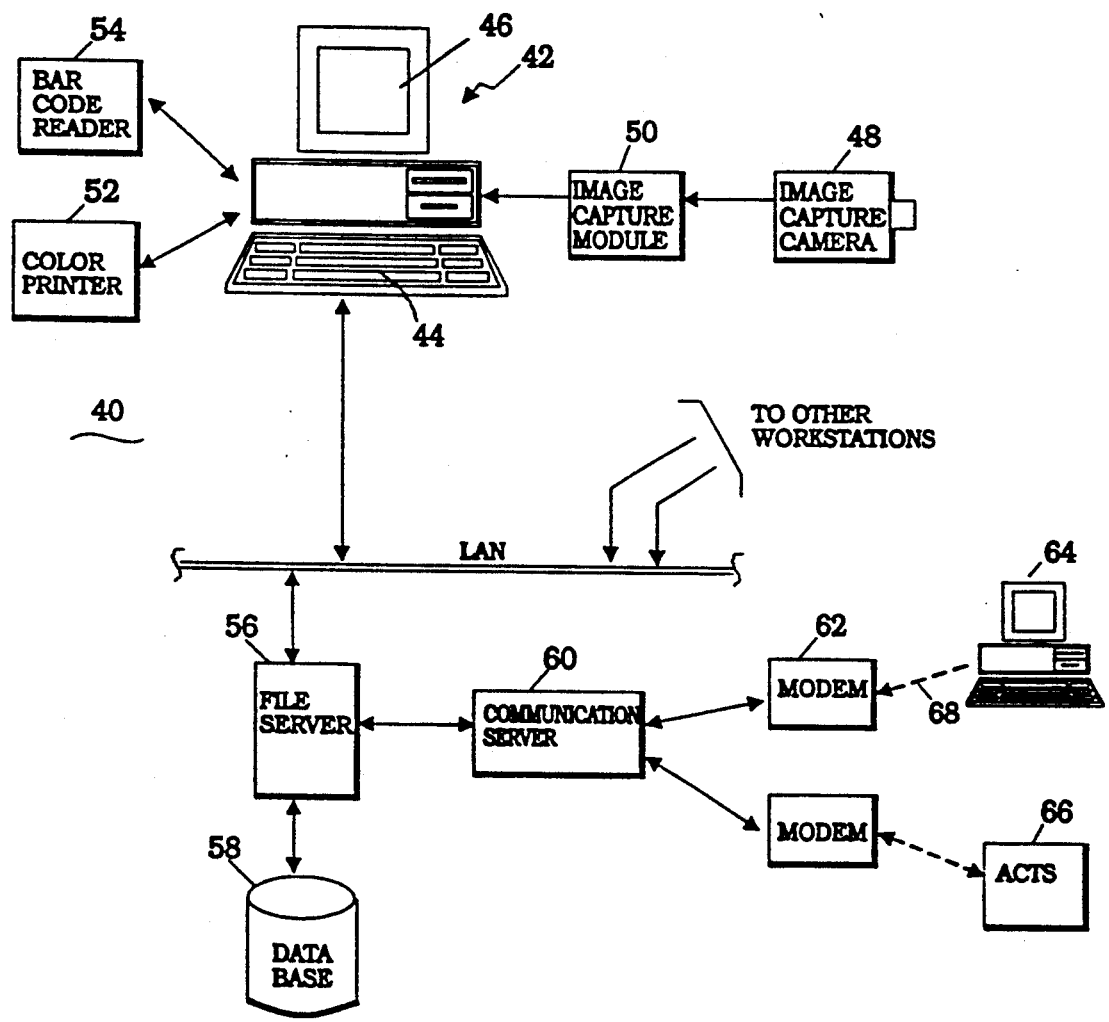
FIG. 3 is a detailed block diagram of the equipment utilized in conjunction with the baggage tracing system of the invention.

FIG. 3 illustrates in block diagram form the equipment that can constitute a bag tracing system of the invention utilizable as system 10, 20 or 24 in FIG. 2. The tracing system 40 includes a 286, 386 type processor or equivalent workstation 42 that is programmed to process the input of bag data and image data as well as claim request data. Associated with the workstation 42 is a keyboard 44 for entering claim requests and bag data in response to menus that are provided on a real time monitor 46. The monitor 46 is preferably a VGA type monitor which can reproduce menus in color, as well as bag video images in color. Associated with the workstation 42 is a video camera 48 for capturing an image of the bag and/or its contents and for transferring corresponding video signals to an image capture module 50 for reformatting the video data. The video data is organized into one or more files, depending on the number of images, and temporarily stored in the memory of the workstation 42. In the preferred embodiment of the invention, the video camera 48 is of the color type for capturing high resolution still images. The image capture module 50 is of the type available from True Vision Company, Indianapolis, Ind., that formats the video image data into a Targa format. The tracing system 40 utilizes software to convert the image from Targa format to a PCX format in order to display the images on the monitor 46. Numerous video compression circuits and techniques are available and are utilized in connection with the present invention to conserve memory space for storing the video data, as well as reduce the time required for transmitting video data within and from the tracing system 40. Video compression can be carried out by software alone, or in conjunction with high speed compression circuits. Preferably, a color printer 52 is connected to the workstation 42 for reproducing PCX format video images as hard copies. Shown also in FIG. 3 is a bar code reader 54 that can be utilized in conjunction with the workstation 42 for reading bar code hang tags attached to baggage. The equipment described above in connection with FIG. 3 can be repeated as other workstations in the system to afford multiple stations for either inputting bag data, claim data, or conducting tracing searches. Each workstation 42 is connected to a local area network such as the Novell type for communicating with a file server 56 that is connected to a hard disk memory 58 for centrally storing all of the bag data and claim data, as well as other management report and statistical data information. It is envisioned that the disk memory system 58 will comprise a number of hard disk drives capable of storing 6-10 gigabytes of data for accommodating data normally encountered in the tracing of domestic bags. In the event the tracing system 40 is to accommodate international baggage claims, the memory system 58 would be larger. The file server 56 can be driven by a 386 processor operating at 25 megahertz or more and preferably a 486 or equivalent type of high speed processor.

In order to accommodate the transfer of bag data and/or claim request information to remote locations, or receive requests therefrom, a communications server 60 is coupled to the file server 56. The communications server 60 is preferably a 286 or 386 type personal computer or equivalent, connected to one or more modems 62 for accommodating the bidirectional transfer of bag and claim data. Shown in FIG. 3 is a remote terminal 64 located at an airline terminal, an airline station or elsewhere. In addition, the modem 62 can be connected to the presently existing ACTS system 66. The interconnection 68 can be a dedicated connection or a dial-up connection to a local area network. While the baggage tracing system 40 is not shown connected as an online system with respect to the remote terminals or systems, those skilled in the art may prefer to provide online connections therebetween, thus creating a wide area network.

Figure 4:
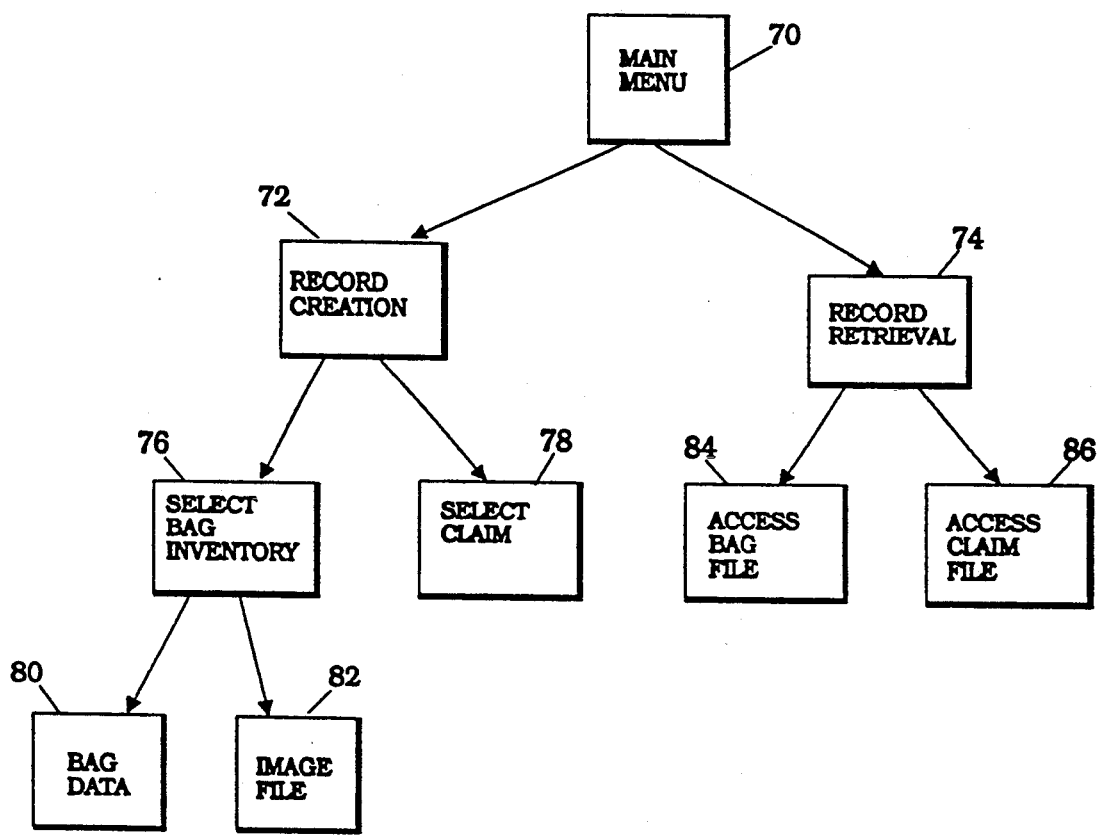
FIG. 4 is a generalized block diagram of the various programmed functions carried out according to the principles and concepts of the invention.

FIG. 4 illustrates the rudimentary programmed functions carried out by the workstation 42 of the tracing system 40. Each workstation 42 is preferably programmed with a Clipper software language to carry out a record creation function 72 as well as a record retrieval function 74. Two primary types of records can be created with the workstation 42, including a bag inventory record 76 and a claim record 78. As described above, the bag inventory record, or bag record 76, comprises all the bag data 80 input via the workstation keyboard 44 to characterize the bag, type, color, owner, etc. The bag record 76 also includes video or image data 82 created by the video camera 48. Data related to claim requests 78 can also be input into the workstation, via the keyboard 44. The claim data can be translated by a workstation operator from a paper form, and entered according to prompted displayed fields presented on the workstation monitor 46 so that complete claim information resides in the data base 58.

Each workstation 42 is preferably programmed to provide record retrieval capabilities 74 for tracing or matching purposes. In other words, an operator can utilize the workstation 42 to retrieve claim requests 86 previously entered, and then based upon the claim requests, access bag records 84 to inspect bag data and video data in an attempt to find matches.

Figure 5:
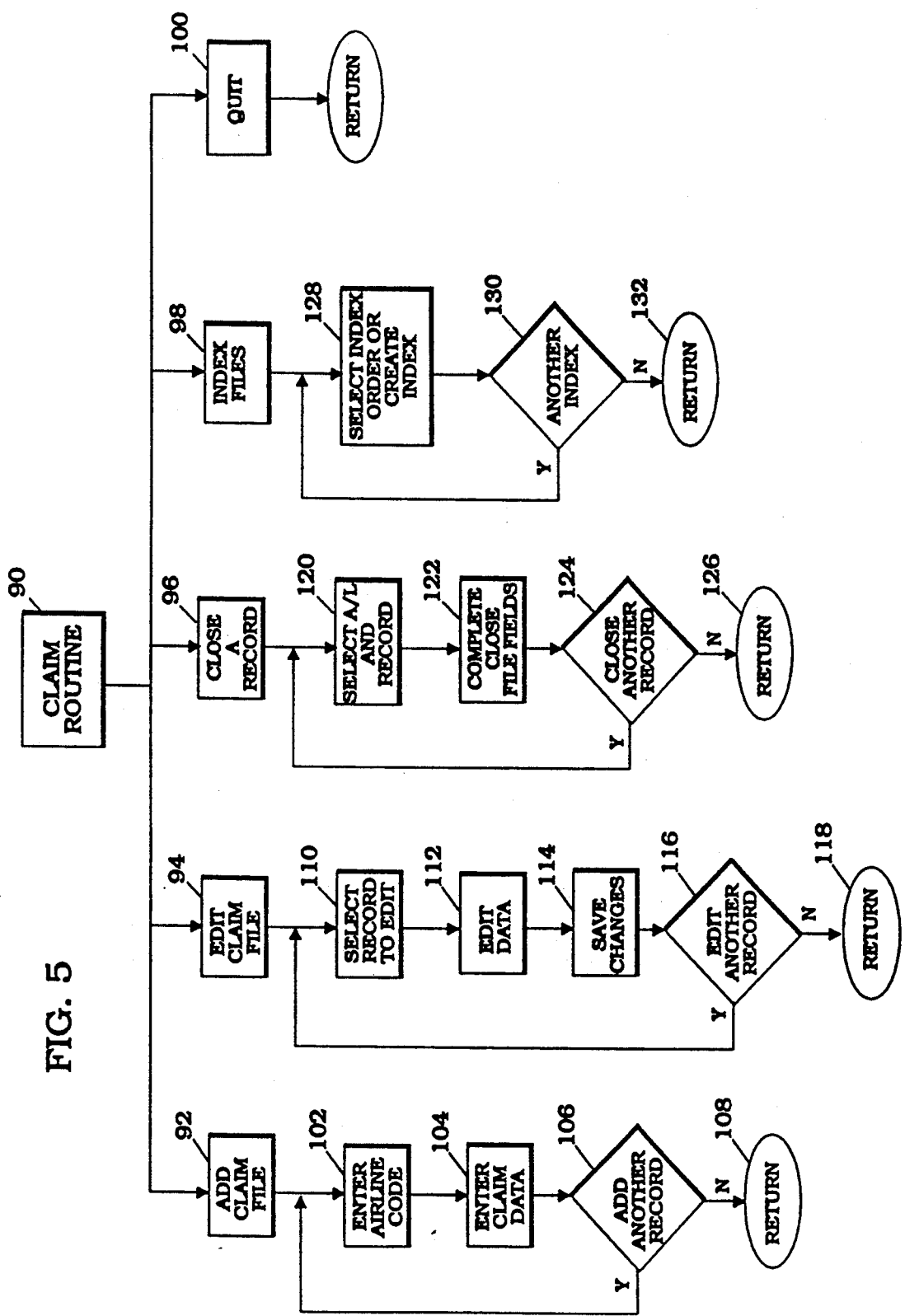
FIG. 5 is a flow chart of the functions carried out by the bag tracing system with respect to claim requests.

With reference to FIG. 5, there are illustrated in program flow form the individual operations carried out with respect to claim requests for lost baggage to create a claim file. Each workstation 42 can include a resident program for carrying out the functions with respect to claims. Subsequent to log in on a workstation 42 by an operator, various prompts appear for allowing selection of various functions, including claim input or retrieval, as well as bag inventory input or bag file retrieval. In the event the operator elects to input claim information or data, there are further options available via prompts, such as shown in FIG. 5 with claim routine 90. In other words, a claim file can be created or added to the data base 58, as shown by program flow block 92, or a claim record can be edited 94. In addition, a claim record can be closed 96 in the event that the bag has been found and returned to the owner, or the respective claim has been paid. Claim records can also be indexed 98 according to predetermined criteria, and the operator can exit the claim section of the workstation program, as noted in program flow block 100.

In the event a claim is to be added to the files of the workstation 42, block 92 is elected by the operator from numerous screen prompts. Generally, claim data is entered into the workstation 42 using a claim form previously filled out by airline personnel responsible for lost baggage and associated claims. In addition, claim data can be entered into the system using loss reports and other supplementary information. It is noted that passengers having lost baggage initially complete a loss report, and if the baggage is not found and returned within five days, the airline personnel send a claim form to the passenger for providing additional information. The claim forms and loss reports can be forwarded to the tracing system of the invention by mail or by electronic transmission techniques. In any event, substantial information is required in completing a claim file to be entered into the data base 58 of the baggage tracing system 40. According to an important feature of the invention, numerous programmed functions are carried out according to block 104, wherein numerous "windows" type of screen displays are presented for prompting the operator to enter certain data in specific sequences. Accordingly, the operator must enter the information in order to complete the claim file. The information entered includes an airline code (block 102) which particularly identifies the airline receiving the passenger claim for lost baggage. Other information entered according to program flow block 104 is illustrated in Table 1 below.

TABLE 1

| | |
|---|---|
| Station Code | XX |
| Report Date | NN/NN/NN |
| Claim Type | XXX |
| Airline File | X's and/or N's |
| Control Date | NNNN |
| Search Parameter | XXN |
| Date of Travel | NN/NN/NN |
| Station Agent | XXXXXXXX |
| How Reported | XXXXXX |
| Where Baggage Checked | XX |
| Mr. or Mrs., | XX |
| Passenger's First Name | XXX... |
| Passenger's Last Name | XXX... |
| Initials | XXXX |
| Social Security Number | NNN-NN-NNNN |
| Address Number | NNN... |
| Street | XXX... |
| City | XXX... |
| State | XX |
| Zip Code | NNNNN-NNNN |
| Home Phone Number | NNN-NNN-NNNN |

After all the data has been entered into the workstation memory for temporary storage, a further prompt appears as to whether or not the operator desires to add another claim file. This is shown in program flow decision block 106. On an affirmative indication, program flow branches back to block 102 where another claim file is created and additional information is entered according to the same program steps carried out above. On a negative determination of program flow block 106, processing returns so that other claim functions can be selected and carried out. In addition, if the operator has completed work with regard to claims, log off or "Quit" functions can be carried out according to block 100, whereupon processing returns to the main program menu to select another function available with the workstation 42.

In the event a claim file edit function is desired by the operator, the functions carried out by program flow block 94 are selected. The edit function of the claim file provided according to the present invention constitutes an improvement over prior, well-known baggage tracing systems where editing claim files was not possible, in view of the CRT or terminal equipment available. In such known systems, an entirely new file had to be rewritten and stored in place of the old claim file. According to the present invention, selected entries or fields of a file can be changed, independently of other fields in the same claim file. When program flow block 94 is entered, the claim file previously being processed is brought up on the monitor screen for editing. In order to edit a file, the screen cursor can be moved adjacent any field, whereupon the field can be changed to update the file, new data can be added, or corrections can be made to a previous field. In the event that another or different claim record is to be entered, other than the record in which the operator is involved, program flow block 110 is entered. Here, a different claim record can be selected and such record can be edited with respect to any field thereof, as illustrated in program flow block 112. If all the changes are to be saved, an appropriate prompt is provided to the operator (block 114) and thereafter decision block 116 is encountered. The operator is then prompted as to the selection of another record for editing, or the return to the main program 118.

Referring now to program flow block 96, the workstation operator can select a course of action for closing a claim file. As noted above, dispositions of lost baggage can be forwarded to the baggage tracing system of the invention in the form of printed reports. Such reports may indicate and confirm that a passenger's baggage has been found and returned, or that the passenger has been paid the amount of the disputed claim. In such event, the claim record is closed so that it can no longer be searched. However, a claim record is not deleted, but can be archived for later review for authentication or statistical purposes. Typically, closed claim records are maintained in archive storage either on hard disk or printed form for an arbitrary two-three years. In order to close a claim record, visual prompts are displayed on the workstation monitor 46 to enter the appropriate airline code and file number (SMI number) that is associated with the claim. This is noted in program flow block 120. While it is possible that different airlines or transport carriers could have the same SMI number, the airline code distinguishes therebetween. Information input according to block 122 requests input as to the manner in which the claim was resolved, such as the bag was found, the claim was settled, etc. According to program flow block 122, an affirmative indication input by the operator causes the claim file to be closed, thereby transferring program flow to decision block 124. Here, the operator can choose to select another claim file for closing, or return 126 to the main program menu.

An indexing function is also provided by the resident program in the workstation 42. The index function can be selected according to the claim program menu, and as shown in program flow block 98 of FIG. 5. According to block 128, a visual prompt on the workstation monitor 46 is presented for enabling an operator to select an index criteria according to a number of listed options. For example, claim files can be indexed according to the last name of the passenger, SMI numbers, address, bag type, etc. A particular index set of claim files essentially creates another file in the system data base 58 which references each claim file associated with the criteria. For example, an index file indexed according to a last name "Smith" will set aside in the system data base 58 all the claim records in which the passenger identified has such a last name. In addition, the baggage tracing system 40 can be programmed to periodically update each index file with new files entered into the system. Program flow block 130 illustrates the option presented to a workstation operator for creating another index, or returning to the main program flow.

Figure 6:
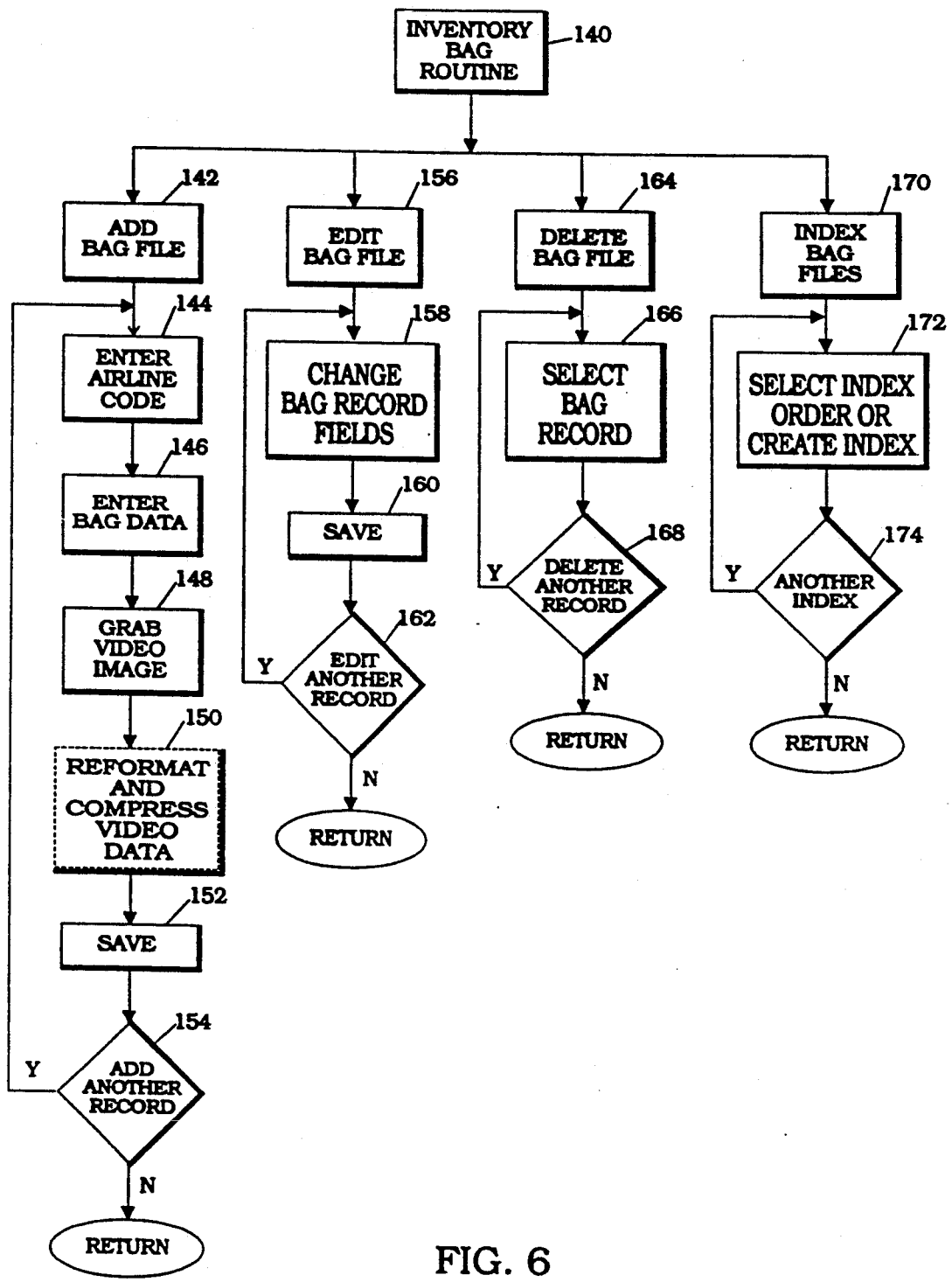
FIG. 6 is a detailed flow chart of the functions carried out by the bag tracing system to inventory a bag and its contents.
Figure 7:
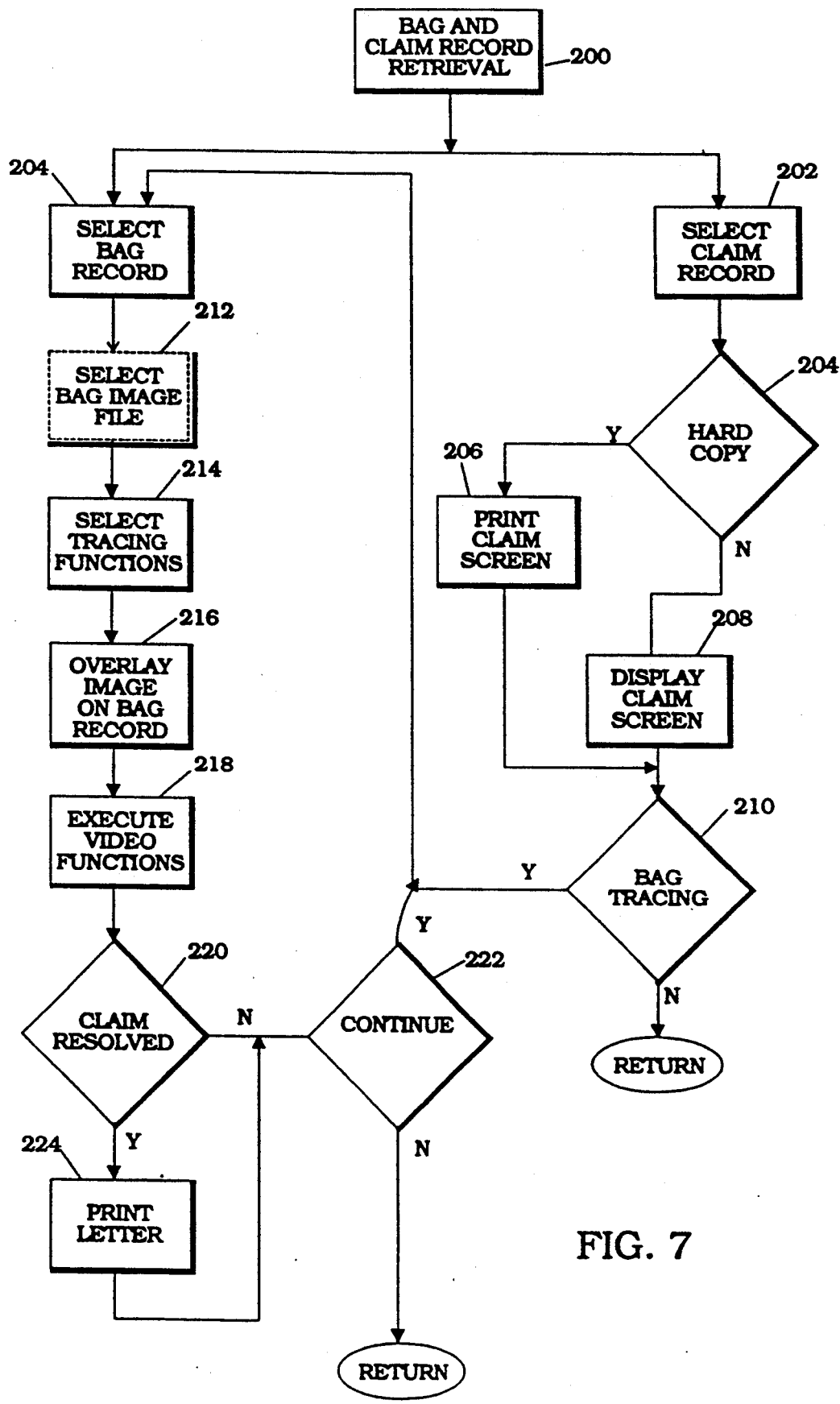
FIG. 7 is a flow chart illustrating the programmed operation of the tracing system for retrieving claim requests and bag files to find matches and near-matches.

FIG. 6 is a flow chart depicting the various software routines or programs relating to bag data that is input by an operator into the workstation 42. While not shown, an initial monitor screen menu allows the operator to select routines for adding bag files, editing bag files, creating bag data index files, and deleting bag files. A subsidiary menu is presented on many of the screen displays which includes selectable entries that, when carried out, allow the operator to manipulate various files. The various selectable functions are noted below in Table 2. Some of the functions are self-explanatory.

TABLE 2

| Quit | Add | Edit | Seek | Replace | Next | Filter | Second | First |
|------|-----|------|------|---------|------|--------|--------|-------|
| Index | Delete | Locate | Continue | Previous | Browse | X Scroll | Grab | |

As can be appreciated, if an operator wants to add another record, the "Add" entry of the subsidiary menu is selected. In the event the operator wants to locate a particular record, the "Locate" function is selected, whereupon the file is sequentially accessed for locating the particular record. The Edit function is used to edit a bag or claim record. The Seek function can be used in connection with an Index function for quickly finding a particular record. For example, the Index function can be utilized to focus on one field of the file, such as "Last Name", and then the Seek function can be used to find one or more records having a particular entry in the "Last Name" field, such as "Smith." Accordingly, all the bag records having a "Smith" name in the Last Name field can be quickly found. In addition, an Anding function can be used with the Seek function to find all the records having a common entry in one field and a common field in another field. For instance, the Index and Seek functions can be used to quickly find all the bag records where the bag owner's name is Smith and the owner's zip code is 70000. The execution of the Replace function can be used throughout many files to replace a field of data with other data. If a "Next" or "Previous" function is desired, the corresponding word can be selected by the cursor for displaying the next or previous claim record. Within a file, the various field entries can be scrolled up or down, by selecting the "Scroll" entry. The Filter function allows the workstation operator to filter out various records that all include a common field, such as all red colored bags, or all claims that were reported before a certain date. The selection of the first or second menu entries selects either page 1 or page 2 of a particular bag record. The Index function allows the establishing of files according to a predetermined criteria. The Locate function is used in tracing bag records for matches with claim requests. This function can locate all records having a common field, such as the bag owner's name. The Continue function allows an operator to go to the next record in the sequence. The carrying out of the Browse function permits the display of an abbreviated form of the files that shows only the more important data, such as the airline, file number, passenger name, bag tag and bag type. This function can be advantageously used in conjunction with the Locate function.

With reference again to FIG. 6, in the event an operator chooses to add one or more bag records to the data base 58, program entry 142 is selected. It is anticipated that two operators will be assigned to each bag inventory station to enter data representative of a lost bag. One person will operate the workstation 42 to enter textual data as well as capture video images of the bag and/or its contents. The other person will physically handle the bag and verbally identify its various aspects, such as type, manufacturer, etc., as well as open the bag and verbally identify its contents and otherwise assist in obtaining video images of the bag and its contents. Preferably, a video camera is situated above a bag counter so that still images can be easily taken of the side of the bag as well as the opened bag with its contents arranged for easy identification and display. Those skilled in the art will find that certain views of the unopened, as well as opened bag will be highly useful in allowing subsequent identification and matching of the bag with a claim. With regard to FIG. 6, the workstation 42 is programmed to display an initial overall form-like display having various fields to be completed by the operator so that all the necessary information concerning the bag is entered. When the operator is actually progressing through the entries, a separate window is automatically presented to the operator for filling in the particular field. According to program flow block 144, the workstation operator begins by entering airline code information into a windowed portion of the screen display. The airline code information is associated with the transport carrier that had the bag and could not identify the owner. The airline code field is identified by a separate menu that is displayed having all of the airline codes and associated airlines so that the particular airline code can be easily selected by placing the cursor adjacent thereto and depressing a keyboard enter key. With respect to program flow block 146, the operator fills in all of the data in the various fields that are separately displayed in the screens shown in Table 3 and Table 4. It should be noted that an SMI number is automatically entered into the bag file on the screen display by the workstation. The SMI number, when associated with the airline code, provides a unique number identifying the bag file. Also, and in accordance with the invention, blocks of SMI numbers allotted to each airline are stored in the data base 58 and made available to the various workstations 42 so that duplicate SMI numbers cannot be utilized by the same transport carrier. The automatic assignment of the SMI numbers eliminates record keeping of such numbers by the workstation operators. The operator then completes each field of the bag data record displayed on the monitor 46, as the cursor automatically moves from field to field after appropriate entry of data therein. The data entered into the bag file is illustrated in Table 3 and Table 4.

TABLE 3

| ADD & EDIT ⟵⟶ MANAGER | |
| --- | --- |
| Airline →WN   Airline Filter→ | Smi_>SHL HDQAA 70002 0730 |
| Last Name→SMITH | Initial→AB |
| Bag Tag→WN116828  Bag Type BN28PXX | Brand→THREES   City Locat→hou |
| Remarks→PA WILLIAM AND MARY SMITH NOVA WASTE PAPER/FE WHT. YLW SANDA | |
| Remarks→LS/SD ORANGE TANK/PD SNAPSHOTS OF CHILDREN | |
| Remarks→ | |
| Remarks→ | |
| Codes→PAPERS FEFFFF SDFFFF PDPHOT | |
| Codes→ | |
| XXXXXX→ | |
| XXXXXX→ | |
| Bagnet Tracer #→ | Shelf Location→ |
| Date File Rec'd→ / / | Date Bag Rec'd→ |
| Date Bag Inv'd→ 07/04/91 | |

Index Set To → None , Filter Set to→

TABLE 4

| ADD 7 EDIT ⟵⟶MANAGER | | | |
| --- | --- | --- | --- |
| High Value→ | Removed?→F | Currency→F | $$→0.00 |
| In/Sys→ | Pax/Station→N | Pax/Bagnet→ | Nite Letter→N |
| Flight1→ | Flight2→ | Flight3→ | Dat31→ / / |
| Address1→000 S. 1st | | Phone1→ — — 0 | |
| City1→LAS VEGAS | | State1→ | Zip1→89101 |
| Address212100 Sharpview Dr. | | Phone2→ — — 0 | |
| City2→HOUSTON | | State2→ | Zip2→77072 |
| Inter Add> | | Country | Date2→ / / |
| Xdeliv→N | | Name→ | |
| Address4→ | | | |

TABLE 4-continued

ADD 7 EDIT ←→MANAGER

| | | | |
|---|---|---|---|
| Salvage→N | Company→ | Date4→ / / | |
| Forwarding→ | | | |
| Requesting→ | | | |

Index Set To → None , Filter Set To→

It should also be noted that much of the data entered by the operator into the bag file can be ascertained from the bag itself, and from the hang tag attached to the bag by the airline. The Tables 3 and 4 illustrate the various fields completed with example data. Also, the code identifying the bag type comprises a standard code developed by the International Air Transport Association (IATA). For example, a type 20 bag is a bag commonly referred to as a garment bag. As can be appreciated, the entry of data to create a bag record is convenient and user friendly with respect to the operator.

As noted in Table 3, a bag record field includes a "shelf location" that identifies the location in the warehouse where the particular bag is located. Of course, at the time of inventorying the bag, the shelf location is not known. However, during inventory of the bag at the workstation 42, the bar code reader 54 is scanned across a hang tag attached to the handle of the bag to enter a unique system number. It is anticipated that the system will provide the various airlines with such hang tags so that control over the numbers and the uniqueness of the numbers can be maintained. In any event, after the bag is inventoried as to its contents and the bag file is completed, the bag is transferred to a warehouse and stored in a particular location. The shelf location also includes a permanent and unique bar code affixed thereto. When storing the bag at the shelf location, a warehouseman will utilize a portable bar code reader for scanning the hang tag as well as the bar code label attached to the shelf. The portable bar code reader will then associate the hang tag bar code with the shelf location bar code. Later, the portable bar code reader will be connected to the system for transferring associated hang tag bar codes and shelf location bar codes, whereupon the system processor will carry out a search of the bag files for the particular hang tag bar code number, and when the particular bag file is found, the processor will automatically fill in the field of the "shelf location" with the shelf location number input into the system by the portable bar code reader. Accordingly, if a bag file is retrieved from the data base 58 and presented on the workstation monitor 46, personnel can automatically determine where the bag is located in the warehouse. Such a feature also provides a convenient audit feature, should airline personnel desire to have identified all of their associated bags and locations in the warehouse. Airline personnel can then physically look at the warehouse shelf locations and ascertain that indeed the bags do exist and are stored in the warehouse.

Program flow block 148 illustrates the step of capturing a video image of either a side view of the bag or an open bag with its contents displayed. It should be noted that while the step 148 is illustrated in a sequence subsequent to 146, the programming of the workstation 42 allows the operator to store a video image whenever the "Grab" menu selection is selected, as shown in Table 2. The workstation 42 is programmed to respond to such input by capturing the video image after assigning thereto the appropriate airline code and SMI number. Preferably, the operator captures one video image of a closed bag and two video images of the bag opened with different contents displayed in two separate arrangements. Program flow block 150 illustrates the step of reformatting and compressing the video data for storage in the data base 58. The step 150 is shown in phantom as it can be carried out at a different time in view that the compression step can take sufficient time that it could interrupt the work of the operator. High speed video data compression can be carried out in real time with known circuits, and thus can be carried out immediately subsequent to capturing the image. At least a 10:1 compression ratio is preferred. It is anticipated that the compression of the video data can occur in software, off-line and during off hours, such as night time. It should also be noted that each video image comprises a separate image file that is associated with the bag data record. To that end, the airline code and SMI numbers of the image file or files and the bag data file are identical, but with the image files bearing suffixes A, B and C for the three video images. Accordingly, the file server 56 can be programmed to access the image files during low-use periods to carry out the video compression functions. As noted above, the video data output by the image capture module 50 (FIG. 3) is reformatted into a PCX format, and thereafter compressed so that the video data is stored in a manner requiring less memory space. Video compression techniques and software are readily available, such as the type Image Alchemy, from Handmade Software, Inc., Los Gatos, Calif. By storing the bag data and associated image data separately, such files can be retrieved independently and observed for bag tracing and matching purposes.

With respect to program flow block 152, the workstation operator is prompted via the monitor 46 to save the record once it has been completed. The execution of a save function by the workstation 42 causes either a bag record or a claim record to be transferred to the hard disk system 58. Decision block 154 comprises another prompt to the operator to continue adding bag records or to return to the main menu.

Similar to the claim request routine, the inventory bag routine includes bag record edit functions, as shown in program flow block 156. According to such block, the workstation operator selects a particular bag record to be edited and proceeds to change one or more fields in the file, as shown in block 158. The changes can be saved (block 160), whereupon the operator is given a choice to select other bag records for editing, or return to the main menu (block 162).

The selection by way of the main menu of program flow block 164 allows the operator to carry out a bag record deletion function. According to program flow block 166, the bag record to be deleted is selected, as is the Table 2 menu text "Delete", whereupon the entire bag file is deleted. Decision block 168 allows the operator to continue the deletion of further bag files, or to return to the main menu for carrying out other functions.

As noted in FIG. 6, the workstation 42 is also programmed so that bag records can be indexed according to various criteria. The bag file indexing function is shown as program flow block 170. As shown in program block 172, the workstation operator selects an index criterion, enters the same in response to a monitor prompt, whereupon the bag records stored in the data base 58 are referenced according to the selected criterion and maintained in an index file of the data base 58. Again, bag records can be indexed according to airline, passenger name, date of travel, bag type, etc.

The workstation 42 can also be utilized for carrying out bag tracing functions. In other words, claim requests can be retrieved from the data base 58, and based upon the claim data, the operator can retrieve various bag records in an attempt to find a match between the lost bag and the claimant. FIG. 4 illustrates numerous programmed functions carried out by the workstation 42 for providing exemplary functions described herein. Entry via the workstation 42 to bag and/or claim files is shown by reference numeral 200. From the screen prompt corresponding to block 200, the operator can either select a claim file 202 or select a bag file 204. As noted, bag record retrieval can be accomplished without carrying out a claim select function. However, claim and bag records can be selected in a sequence, such as is convenient when carrying out matching functions. For example, if the responsibility of the operator is to match claims with lost baggage, then the claim record retrieval function 202 would be carried out first. In selecting a claim record, the operator may arbitrarily retrieve any claim, or select a particular claim, based on the airline, age of claim, etc. From block 202, the operator can either be presented with a decision 204 as to whether a hard copy of the claim is required or not. If a hard copy is required, the claim is printed 206 by a conventional printer (not shown) connected to the workstation 42. In the event no hard copy of the claim request is required, processing branches to block 208 where the claim is displayed on the monitor 46 of the workstation 42. Next, if bag tracing is requested by the operator, according to block 210, program flow branches 204 where a bag file is selected. Otherwise, from decision block 210, program flow returns to the main menu. After a claim request is either printed in hard form or displayed on the screen, and after a bag record is selected according to block 204, a bag image file is optionally selected, as noted in program flow block 212. In program block 214, various tracing functions are available to the workstation operator, such as those noted in Table 2 above. In accordance with an important feature of the invention, an optional menu entry can be selected, whereby the bag record data is overlaid with the bag image on the workstation monitor 46. It is possible that the claim record data and the bag record data can be displayed in split screens so that both records can be viewed simultaneously on the same screen. In addition, and not shown, the bag image can be presented on the color printer 52, or another color monitor. The dynamic presentation of image data and the bag data on the workstation monitor 46 allows the operator to compare the bag and/or the bag contents with the data of the claim request. Those skilled in the art may find it advantageous to present the bag data and image data on split screens, or to present the bag data on a majority of the screen with the image reproduced on a small section thereof, such as a corner.

According to program flow block 218, various video functions can be selected by the operator, such as zooming in on a portion of the bag image or bag contents image. Image processing programs are commercially available for processing image data to enlarge, reduce, rotate, convolve, etc. While not shown, various return routes are available from program flow block 218 to select another bag file, display a video image thereof so that the tracing and matching function can be repeated in an attempt to match a lost bag with the claim. If the operator decides that the data between the bag record and the claim record correspond sufficiently close, then a match may be confirmed. On confirmation of a match, a decision block 220 is encountered, where it is determined whether or not a claim has been resolved. If not, program flow branches to block 222 where it is determined if searching is to be continued, and if so, control is returned to block 204 to select another bag file. If a negative determination results from block 222, the searching ends and the program returns to the main menu. In reference to an affirmative determination of block 220, a letter can be printed and thereafter searching may continue or be terminated according to program decision block 222. Correspondence printed according to block 224 may be a form letter which repeats some of the data of the bag file, a color copy of the bag and the potential owner's address according to information in the claim file. Further, other record copies of correspondence and hard copy file data may be printed according to block 224. As can be appreciated, the searching function carried out according to the foregoing is much simplified and can be expedited by the utilization of the bag tracing system of the invention.

As noted above in connection with the bag tracing system of FIG. 3, the file server 56 periodically transmits bag file data to a remote tracing system, such as the ACTS System 66. FIG. 8 illustrates the programmed steps carried out by the file server 56 in reformatting the bag file data for serial transmission to the ACTS system 66. Program flow block 240 is carried out on a managerial basis, in that a conversion software program is called to convert specified files of bag data into an ASCII format acceptable by the ACTS system 66. The conversion program can be run automatically, or on an as need basis, to transfer bag record data to the ACTS system 66. Again, the call up function of the conversion program is selectable by way of menus presented on the workstation 42, or by way of a terminal connected to the file server 56. With respect to program flow block 242, there is presented a screen menu concerning a listing of the airline codes which are to be selected for conversion to an ACTS format. While bag record data could be mixed as to the various airlines and transmitted to the ACTS system 66, the preferred embodiment of the invention performs a conversion of the bag data for one airline, transmits such converted data, and then continues with the bag files of another airline. According to program flow block 244, the bag tracing system automatically reformats the data into ASCII format for serial transmission via the communications server 60 and modem 62 to remote systems, such as ACTS 66. Those skilled in the art may find that other communications programs may be required or may be found to increase efficiency in converting and reformatting the data.

It should be noted that an operation similar to that shown in FIG. 8 is carried out with respect to the reformatting of the claim files prior to transmission to the ACTS system 66. During the reformatting operation, and in accordance with conventional designation practices, the claim records are each identified by an SND number, while the bag records are preceded by an SHL number.

FIG. 9 depicts a programmed routine for transmitting file messages to the ACTS system 66 when bag matches have been found. Such messages are recognized by the ACTS system as "Xdelivery" messages. The Xdelivery message is called according to program flow block 250. According to programmed operations 252, the airline noted on the bag record is entered into the workstation 42 as is the file number, shown in program flow block 254. Entered also is data indicating that the bag as been found and other routine information, such as date found, etc. The file is then transmitted to the ACTS system 66 (block 256) and decision block 258 is encountered. According to this decision block, another file can be prepared for Xdelivery transmission, or return can be made to the main program menu. When received by the ACTS system 66, the Xdelivery messages are noted as such, however, such bag files continue to be routinely searched for matches for a nominal period of time. Personnel conducting matching functions on the ACTS system 66 can review the near-match printouts and discard the near-matches made on Xdelivery baggage.

Figure 10:
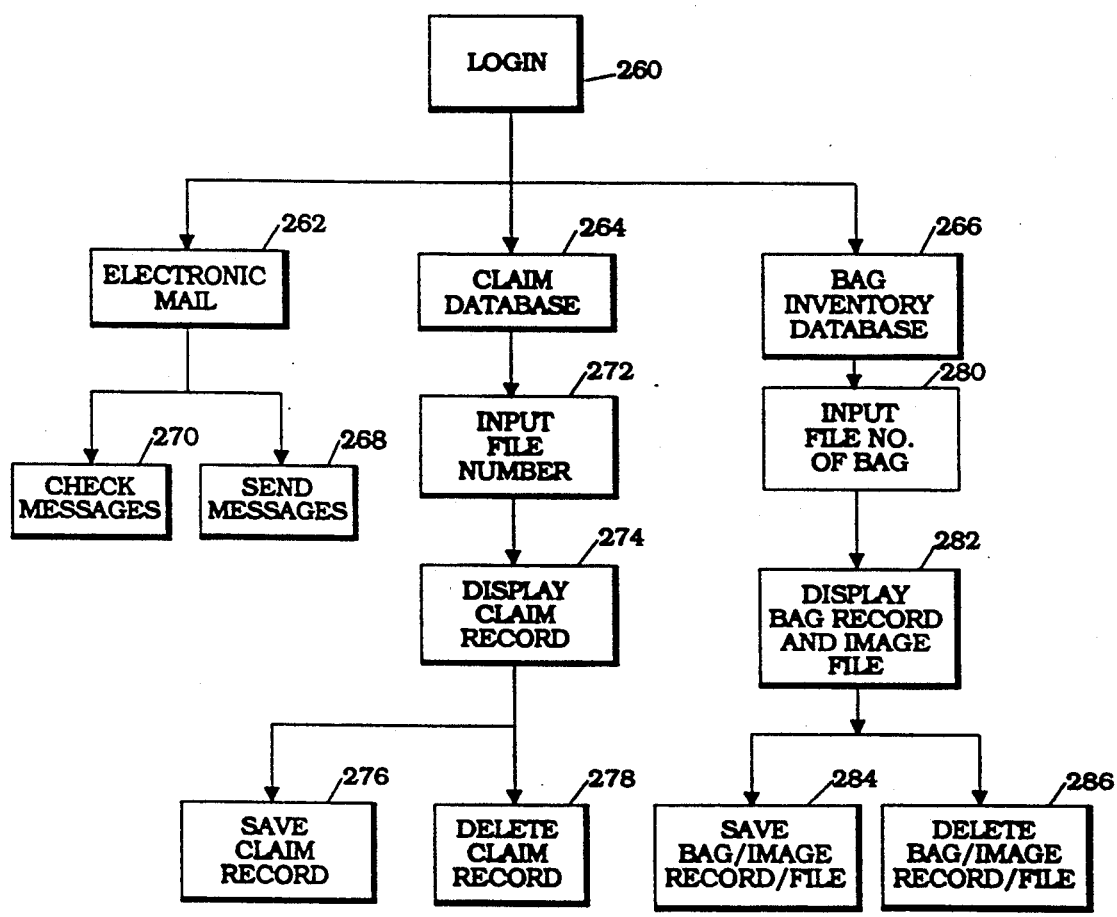
FIG. 10 is a flow chart of the programmed operations of a remote terminal for accessing bag and claim data from the tracing system data base.

As noted above in connection with FIG. 3, remote terminals 64 can be connected to the bag tracing system 40 of the invention for retrieving bag and claim record data therefrom. For example, a remote computer terminal 64 can be located at an airline ticket office, a travel agent office or other business office that may have an interest in lost baggage. FIG. 10 is a program flow chart illustrating the basic software operations that can be carried out by such a remote terminal 64. It should be appreciated that the remote terminal 64 can include a desk-top type of workstation, a keyboard, monitor, printer and hard copy color reproduction capabilities.

With reference to FIG. 10, a login operation 260 is shown, wherein the monitor screen displays a menu for selecting three primary operations, namely, electronic mail 262, claim data base 264 and bag inventory data base 266. If the electronic mail 262 portion of the menu is selected, the operator can either further select the option of sending electronic mail message 268 to the bag tracing system 40, or send messages to other remotely-located workstations. In addition, the receipt of other electronic mail messages can be reviewed by way of programmed option 270. The messages may relate to lost and found baggage, and may comprise instructions for airline personnel to contact a passenger to obtain further information or to have passengers identify lost bags from reproduced color images.

The remote terminal 64 is also programmed to access the claim file from the centrally located data base 58 of FIG. 3. Main menu selection 264 causes entry into a claim retrieval program. The workstation operator then inputs one or more claim record numbers at appropriate menu prompt locations. The claim record information requested is transmitted to the bag tracing system 40 for retrieval thereof (block 272). Once a claim record is retrieved from the central data base 58, it is displayed 274 on the monitor screen of the remote terminal 64. Importantly, the remote terminals are programmed for read-only capabilities, and cannot modify or otherwise delete files from the central data base 58. However, the claim file can be saved in a disk drive, or similar storage medium, at the remote terminal 64, such as shown by program block 276. The claim record can also be deleted in the remote storage medium, as shown by block 278. While not shown in the flow diagram, the operator can return and retrieve and review yet other claim records obtained from the central data base 58. For purposes of convenience, or record keeping, claim records can be printed as hard copies, as well as for bag searching or tracing purposes.

As noted above, bag records of the bag inventory data base preferably comprise two screens for depicting all of the information concerning the bag, the owner, addresses, time of flight, and other information such as shown in Tables 3 and 4. According to program flow block 280, a screen prompt solicits entry of a bag file number and whether or not video images are to be transmitted therewith. A dial-up connection to the bag tracing system 40 is also established. Program flow block 282 shows those software operations for displaying one or the other of the pages of the bag record, for displaying a corresponding bag image, or causing the bag image to be reproduced in hard copy form. Again, the bag files can be locally saved 284, or can be locally deleted 286. By having available claim data as well as bag file data at the remote terminal 64, bag tracing functions can be carried out.

As noted above, the bag tracing system 40 of the invention provides a substantial improvement in the efficiency by which bags can be traced and matched with owners. According to prior well-known matching techniques, tracing personnel had available only the ACTS printout of the near-matches. In other words, one printout by the ACTS system 66 defined by an SND number illustrated in cryptic form, limited claim information. Numerous other ACTS printouts, defined by SHL file numbers, also illustrated limited information concerning various lost bags and associated data that were candidates for matching with the claims. It should be appreciated that the job of the tracing personnel was simply to visually look at the limited claim information in view of the many near-match printouts of lost bags to ascertain whether a match existed. Often, the tracer's last option was to make a telephone call to the bag warehouse to have other personnel look through various bags for further information or identifying indicia in an attempt to find a match. It can be appreciated that this was a time consuming and inefficient operation, and hence, only 15%-40% of the lost bags were matched within about a sixty day period.

Figure 11:
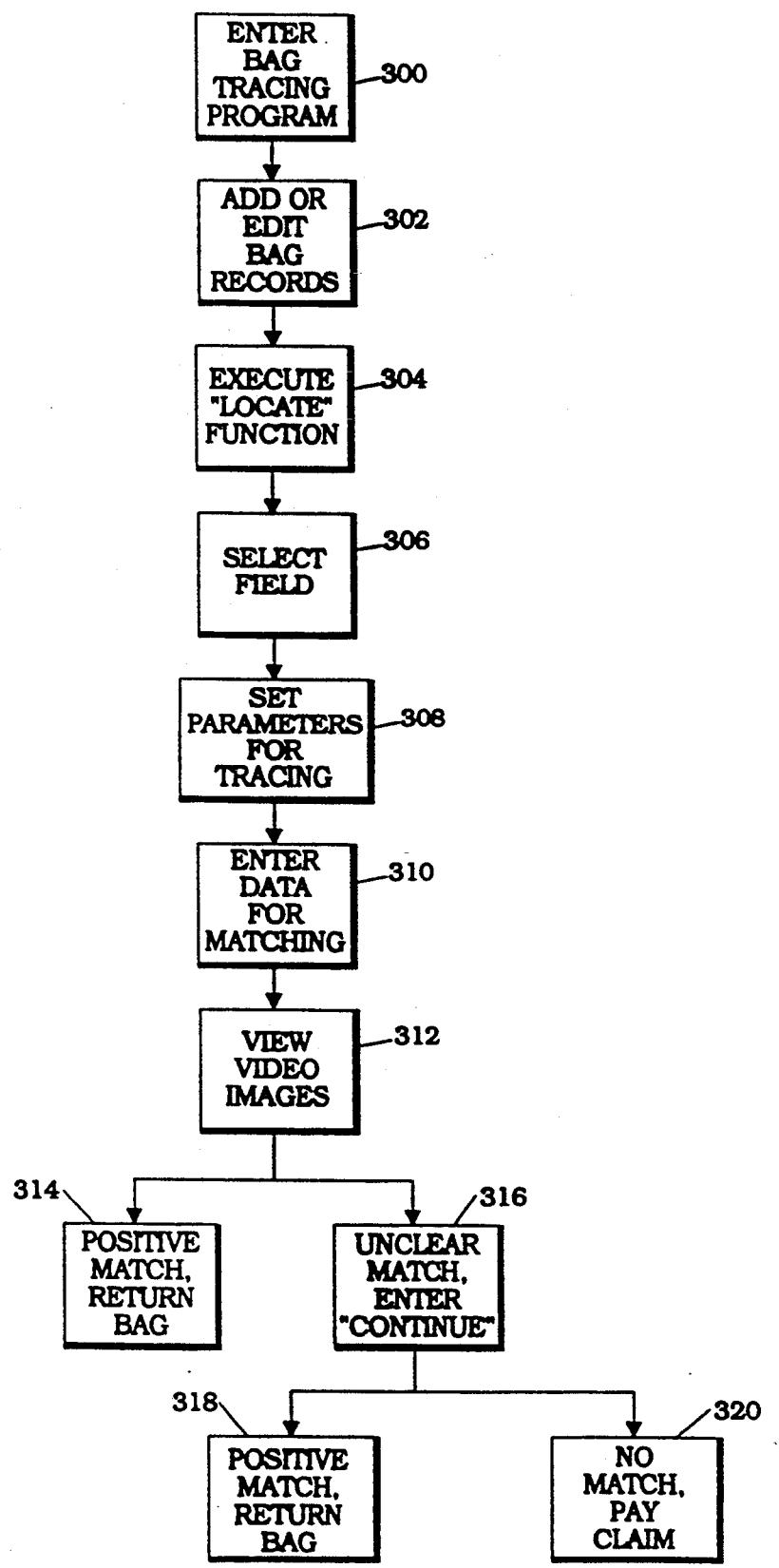
FIG. 11 is a flow chart of the steps carried out by tracing personnel using the bag tracing system to find matches between claim requests and lost bags.

According to the methods and apparatus of the present invention, bag tracing personnel have available substantial additional information for carrying out matching functions. With regard to FIG. 11, there are shown example operations carried out by a bag tracer using the bag tracing system 40 of the invention. Bag tracing personnel can utilize the workstation 42 of FIG. 3, remote terminals 64 or any other system that has access to the central data base 58, or access to the bag file data. Step 300 illustrates the activities of bag tracing personnel for accessing the bag records resident in the data base 58. Again, numerous screen prompts and menus are available for assisting the operator throughout the tracing steps. Step 302 indicates an option to the bag tracing personnel for selecting or editing bag records. During search or tracing of bag records, the add option would be selected. According to step 304, and with reference to the searching options of Table 2, the tracing personnel can select numerous operations for carrying out the trace. For example, the "Locate" option can be selected, as shown in step 304, for carrying out a search with respect to a particular field in the bag records to be searched. In step 306, the field selected by the operator is entered, whereupon the bag tracing system 40 locates the numerous bag records satisfying the selected field. For example, the operator can search all the bag records in the data base 58 to locate those files having a common owner name, a common bag type, a common bag brand, owner's address, telephone number, zip code, etc. In other words, the bag tracing personnel can inspect the claim request and determine the best fields of the bag records to search in order to increase the possibilities of achieving a match. To that end, the tracing personnel can select their own criteria for carrying out the search. Moreover, the criteria can be changed during the search, or after a previously selected criteria has been exhausted and a match has not been found. The field selected according to step 306 can also be carried out by utilizing an "ANDING" function between various fields to further optimize the possibility of a match. For instance, tracing personnel can select a name field as well as a bag brand field in order to increase the possibility of match. The selected fields may be "Smith and Gucci" in the respective fields of the bag file, whereupon the file server 56 will search all of the bag records in the data base 58 for those satisfying both of the selected tracing criteria. The tracing parameters are set according to step 308 and entered into the workstation 42, as shown by step 310.

In response to the input of the search criteria entered according to step 310, a first bag record satisfying the criteria is retrieved and displayed on the monitor screen. Page 1 or page 2 of the bag record can be reviewed by the tracing operator. As noted by reference character 312, video image data can also be viewed for further enhancing the possibility of a match with the claim. In the event a positive match is made, as shown by step 314, other operations can be carried out to return the bag to the claimant. This would occur if a substantial amount of information on the claim request matched the information reflected in the particular bag file. If the bag record does not clearly match the claim request, or if a match is unclear, as noted by step 316, the tracing personnel can simply execute a "Continue" command selected according to the subsidiary menu shown in Table 2 above. A continue function is carried out by the workstation 42 to select the next bag record satisfying the same criteria selected according to step 306 and entered pursuant to step 310. The tracing personnel can inspect the next bag record and again determine if a match exists, and if not, input another continue command. The entire string of bag records that satisfy the search criteria can be retrieved and viewed in sequence to determine whether the particular bag record matches the claim request. Again, if a positive match can be made, as noted by step 318, the bag is returned to the passenger. On the other hand, if no match or no near-match exists at all, an indication thereof can be entered into the bag tracing system 40, whereupon the airline is authorized to pay the passenger's claim.

It can therefore be seen that the bag tracing system of the invention makes available to tracing personnel all the information concerning the bag, as well as all the information concerning the claim itself. Numerous bag records can be searched in a sequence, according to search criteria developed by the personnel themselves. Further, video images of the bag and/or contents are readily available to provide tracing personnel with additional information for matching bags with claims. The searching procedures are more user friendly, easier to learn, and can be carried out in a more organized manner to achieve positive results.

From the foregoing, an improved, computerized baggage tracing system has been disclosed. The system of the invention is a centralized repository of bag and claim data, input according to specific procedures to standardize and make more uniform the information necessary to match lost baggage with claim requests. The tracing system of the invention is menu-driven for entry of data with respect to both claim records and bag data records. According to an important feature of the invention, video images are collected with respect to lost baggage, and the image files are associated with the bag data records during the inventory process. The organization of the bag data records as well as the accompanying video images substantially enhances the process of matching claims requests with lost baggage. The baggage tracing system of the invention can operate autonomously with regard to the input of claim and bag record data as well as for carrying out matching functions. In addition, the baggage tracing system can operate in conjunction with other tracing systems for the communication of bag and file data thereto, or the receipt of claim requests and the results of near-matches.

While the preferred and other embodiments of the invention have been disclosed with reference to specific equipment and programmed operations, it is to be understood that many changes in detail may be made as a matter of engineering and programming choices, without departing from the spirit and scope of the invention, as defined by the appended claims.

What is claimed is:

1. A baggage tracing system, comprising:
   a plurality of workstations, each programmed for providing for the input of bag data;
   a data base associated with said workstations for storing bag data;
   each workstation being associated with a bag inventory station for providing bag content data to the respective workstation; and
   imaging apparatus for capturing a video image of a lost bag, said video image defining image data stored in association with bag data in said data base.

2. The baggage tracing system of claim 1, wherein each said workstation is programmed for inputting claim request data.

3. The baggage tracing system of claim 1, further including a centralized data base connectable to each said workstation data base for centrally storing data.

4. The baggage tracing system of claim 3, further including means for remotely accessing bag data and image data from the centralized data base.

5. The baggage tracing system of claim 3, further including a local area network connecting a file server to each said workstation, said file server controlling access to said centralized data base.

6. The baggage tracing system of claim 1, wherein each said workstation is programmed to input bag and image data, and to retrieve said bag and image data for display on a monitor.

7. The baggage tracing system of claim 1, further including in combination a video camera for capturing bag images, one said video camera being connected to each said workstation for providing image data thereto 8. The baggage tracing system of claim 1, further including bar code reading apparatus connected to each said workstation for inputting bag bar code data into said workstation.

9. The baggage tracing system of claim 1, wherein each said workstation is programmed to carry out bag tracing functions by responding to input commands for selectively accessing bag files having bag data that corresponds to predefined criterion input by a user of the workstation.

10. A method of operation of a baggage tracing system, comprising the steps of:
   inputting bag file data into a workstation;
   inputting video image data of a bag into the workstation;
   assigning a file number to the bag file data and the video image data;
   transferring the bag file data and the video image data from the workstation to a centralized data base for storage as a bag record; and
   retrieving the bag file data and the video image data from the centralized data base in response to a request to match a lost bag with a claim.

11. The method of claim 10, further including storing lost bag claim data in said centralized data base.

12. The method of claim 10, further including presenting on a monitor display a sequence of menus prompting an input of predefined data corresponding to a lost bag.

13. The method of claim 12, further including opening the lost bag and inputting bag content data into the workstation in response to ones of said menus.

14. The method of claim 13, wherein said bag content data is entered via a keyboard associated with said workstation.

15. The method of claim 13, wherein said bag content data comprises video image data of bag contents entered via a video camera connected to said workstation.

16. The method of claim 10, further including retrieving a plurality of bag records according to a preselected criterion, and in response to an input command, sequentially displaying on a monitor bag data from said bag records.

17. A method of tracing lost baggage in a baggage tracing system, comprising the steps of:
   retrieving lost bag claim data from a data base;
   retrieving a bag record including bag file data and video image data from a data base and displaying the bag file data and video image data on a monitor screen;
   comparing the lost bag claim data with the bag file data and the video image data to determine if a match exists;
   if a match does not exist, displaying on the monitor screen other bag data from a different bag record to determine if a match then exists; and
   if a match is found, returning the lost baggage to an owner thereof.

18. The method of claim 17, further including retrieving the bag records according to a predefined criterion, and in response to an input command, displaying the bag file data in a sequential manner.

19. The method of claim 18, further including "Anding" different fields of a bag file to identify bags according to a search criterion.

20. The method of claim 17, further including displaying on a monitor screen bag file data and claim request data.

21. The method of claim 17, further including retrieving video image data of bag contents from the data base, and presenting an enlarged image of selected contents of the bag on the monitor screen.

22. The method of claim 17, further including indexing bag files according to a predetermined index criteria.

23. The method of claim 17, further including selecting a plurality of bag files from the data base according to a preselected criteria, and sequentially displaying on the monitor screen abbreviated bag data of said selected bag files.

24. A method of operating a processor controlled workstation to carry out bag tracing functions, comprising the steps of:
   operating a workstation program to retrieve bag record data from a data base having stored therein lost bag records and corresponding video image data;
   displaying on a monitor screen a menu related to tracing functions;
   in response to a workstation input indicating a selection of a tracing function, selecting bag records from the data base according to a predefined criterion; and
   retrieving video image data from the selected bag record and displaying on the monitor screen the retrieved video image data.

25. The method of claim 24, further including programming the workstation with a tracing function that searches bag records having common data in selected fields of the bag records.

26. The method of claim 25, further including in response to a predefined input, displaying preselected fields of the bag record having said selected field with common data.

27. The method of claim 25, further including providing a tracing function for carrying out searches of bag records having common data in a first field thereof and having common data in a second field thereof.

28. The method of claim 24, further including comparing the displayed video image with claim request data identifying a lost bag.

29. The method of claim 24, further including retrieving video image data stored in the data base, and sending the video image data to a remote location for display thereof.

30. An article tracing system for finding lost articles in response to article claim requests, comprising:
   a plurality of article processing stations, each having an article receiving area for inspecting unclaimed articles and contents thereof, each article processing station having a computerized article processing unit for entry therein of article data for creating an article file associated with an unclaimed article and its contents;
   video capture apparatus for providing image data of an unclaimed article;
   a centralized data base connected to each said article processing station for receiving article files and image data for providing centralized storage thereof; and
   a plurality of computerized article tracing units programmed for carrying out article tracing functions, said computerized article tracing units being adapted for accessing said centralized data base for retrieving the article files and image data for display thereof so that the displayed data can be compared with an article claim request.

31. The article tracing system of claim 30, wherein said computerized article processing units comprises the computerized article tracing units.

32. The article tracing system of claim 30, further including a computerized claim processing unit for entering article claim requests for storage in the centralized data base.

33. The article tracing system of claim 32, wherein said system is programmed to carry out comparisons of stored article claim request data with article file data to produce near match results.

34. The article tracing system of claim 30 further including a system input/output for communicating article file data between the article tracing system and a remote location.

35. The article tracing system of claim 30, wherein each said computerized article processing unit comprises a workstation.

36. In a baggage tracing system of the type utilized in matching unclaimed baggage with owners thereof, and of the type having computerized facilities for storing data identifying an owner and an unclaimed bag, the improvement comprising:
- a video image for generating video signals defining an unclaimed bag;
- a converter for converting the video signals to corresponding digital signals defining the unclaimed bag; and
- said computerized facilities being programmed to store the digital signals in association with a unique file associated with the unclaimed bag.

37. The improved baggage tracing system of claim 36, further including means for accessing the unique file for retrieving the digital signals and converting the digital signals into other signals so that an image of the unclaimed bag can be visually displayed.

* * * * *